United States Patent
Irie et al.

(10) Patent No.: US 11,615,132 B2
(45) Date of Patent: Mar. 28, 2023

(54) FEATURE AMOUNT GENERATION METHOD, FEATURE AMOUNT GENERATION DEVICE, AND FEATURE AMOUNT GENERATION PROGRAM

(71) Applicant: NIPPON TELEGRAPH AND TELEPHONE CORPORATION, Tokyo (JP)

(72) Inventors: Go Irie, Tokyo (JP); Kaoru Hiramatsu, Tokyo (JP); Kunio Kashino, Tokyo (JP); Kiyoharu Aizawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 158 days.

(21) Appl. No.: 17/260,540

(22) PCT Filed: Jul. 8, 2019

(86) PCT No.: PCT/JP2019/027005
§ 371 (c)(1),
(2) Date: Jan. 14, 2021

(87) PCT Pub. No.: WO2020/017380
PCT Pub. Date: Jan. 23, 2020

(65) Prior Publication Data
US 2021/0271702 A1 Sep. 2, 2021

(30) Foreign Application Priority Data
Jul. 17, 2018 (JP) .............................. JP2018-134398

(51) Int. Cl.
*G06F 16/00* (2019.01)
*G06F 16/45* (2019.01)
(Continued)

(52) U.S. Cl.
CPC ............ *G06F 16/45* (2019.01); *G06F 16/438* (2019.01); *G06K 9/6239* (2013.01); *G06V 10/75* (2022.01)

(58) Field of Classification Search
CPC ...... G06F 16/45; G06F 16/438; G06K 9/6239; G06K 9/623; G06V 10/75; G06V 10/7715; G06V 10/771; G06V 20/46; G06T 7/00
See application file for complete search history.

(56) References Cited

U.S. PATENT DOCUMENTS

2002/0105541 A1* 8/2002 Endou .................... G06F 16/54
715/738

FOREIGN PATENT DOCUMENTS

JP 2010282277 A 12/2010

OTHER PUBLICATIONS

Krizhevsky et al. (2012) "ImageNet Classification with Deep Convolutional Neural Networks" Proceedings of the 25th International Conference on Neural Information Processing Systems—vol. 1, Dec. 2012, pp. 1097-1105.

* cited by examiner

*Primary Examiner* — Jared M Bibbee (57) ABSTRACT

Low-dimensional feature values with which semantic factors of content are ascertained are generated from relevance between sets of two types of content.

Based on a relation indicator indicating a pair of groups indicating which groups are related to first types of content groups among second types of content groups, an initial feature value extracting unit 11 extracts initial feature values of the first type of content and the second type of content. A content pair selecting unit 12 selects a content pair by selecting one first type of content and one second type of content from each pair of groups indicated by the relation (Continued)

indicator. A feature value conversion function generating unit 13 generates feature conversion functions 31 of converting the initial feature values into low-dimensional feature values based on the content pair selected from each pair of groups.

20 Claims, 4 Drawing Sheets

(51) Int. Cl.
*G06F 16/438* (2019.01)
*G06K 9/62* (2022.01)
*G06V 10/75* (2022.01)

FEATURE AMOUNT GENERATION METHOD, FEATURE AMOUNT GENERATION DEVICE, AND FEATURE AMOUNT GENERATION PROGRAM

CROSS-REFERENCE TO RELATED APPLICATIONS

This application is a U.S. 371 Application of International Patent Application No. PCT/JP2019/027005, filed on 8 Jul. 2019, which application claims priority to and the benefit of JP Application No. 2018-134398, filed on 17 Jul. 2018, the disclosures of which are hereby incorporated herein by reference in their entireties.

TECHNICAL FIELD

The present invention relates to a feature value generation method, a feature value generation device, and a feature value generation program that are capable of learning a feature value for ascertaining semantic factors of individual content when generating a feature value to search for or recognize content such as images, sounds, videos, and the like.

BACKGROUND ART

With advances in the level and quality of communication environments, computers, general distributed processing technology, and the like, vast types of media content (images, videos, sounds, and the like) are circulated through networks. For example, the number of web pages indexed by certain search engines is said to be trillions. At a certain site, 3.5 hundred million images are reported to be uploaded every day. At a certain site, 64 hours of videos are also reported to be newly shared every minute.

Such a vast amount of content is an abundant information source for users. On the other hand, a problem arises in that it is more difficult to access content which users desire to browse quickly. In such circumstances, there are increasing requests for media analysis technologies for efficiently searching for content which users desire to browse and view.

In content analysis, a procedure for finding semantically related content plays an important role. For example, when content classification is considered, the content that represents the same semantic concept is usually classified into the same category. Alternatively, when users search for content and the content is given as a query, a basic requirement is to search for content semantically related to the content. In addition, in the case of content recommendation, it is necessary to find and recommend content semantically similar to content which users have browsed or are browsing. Even in the case of content summary, it is necessary to perform processing of summarizing factors which are not semantically repeated.

A general procedure of finding semantically related content will be described. First, content is expressed in accordance with a certain feature value. Subsequently, similarity is calculated by measuring closeness between feature values, and content is considered to be semantically related as the similarity is closer. As a simple example, when content is images or videos, color histograms of images (video frames) can be used as feature values to measure similarity between the images or videos. In the case of sound signals, an analysis (a spectrogram or the like) of frequency characteristics of the waveforms of the sound signals can be used as feature values to measure similarity. It is needless to say that if the number of types of content is 1,000, it is necessary to calculate similarity of each of 1,000 types of content and pick content with high similarity results as similar content.

However, in order to find semantically similar content, feature values indicating semantic factors by which semantically related content is correctly evaluated to be close are required to be obtained.

In general, a feature expression of content such as images, videos, sounds, or the like mostly indicates a physical nature, as typified by an image feature value such as the above-mentioned color histogram. However, even when physical feature values are close, not surprisingly, the content may not necessarily be semantically related. For example, content that should be deemed similar content to an image of "a (red) apple" is "a blue apple," which is the same fruit, or "an orange," rather than "a red bag," but, at least using the closeness of the color histogram, these fruits cannot be evaluated correctly.

In view of the above background, it is desirable to provide a technology capable of generating a feature value of content with which semantically related content can be found practically.

In the related art, several inventions related to such technologies have been disclosed. For example, the technology disclosed in NPL 1 discloses a method of learning a relation between an image and a semantic label (that is, a label indicating a semantic category to which an individual image belongs) using a convolutional neural network (CNN) and quantifying feature values when many image groups and semantic labels incident to the image groups are given.

The technology disclosed in PTL 1 discloses a feature value generation technology for reducing dimensions of original feature values to low-dimensional feature values when two types of content of which one or both of feature values are deficient and which do not simultaneously co-occur are included in compression of the feature values of the two types of content which simultaneously co-occur.

CITATION LIST

Patent Literature

[PTL 1] Japanese Unexamined Patent Publication No. 2010-282277

Non Patent Literature

[NPL 1] Alex Krizhevsky, Ilya Sutskever, Geoffrey E. Hinton, "ImageNet Classification with Deep Convolutional Neural Networks." In Proc. Advances in Neural Information Processing Systems (NIPS), Pages. 1097-1105, 2012.

SUMMARY OF THE INVENTION

Technical Problem

In the technology disclosed in NPL 1, semantic image feature values can be obtained by learning a relation between an image and a semantic label based on a pair of the image and the semantic label. In the technology, however, it is assumed that a vast number of images (for example, about 1.2 million images in an example disclosed in NPL 1) and semantic labels paired with the images are known. In many cases, when the semantic labels are given to the images, the semantic labels have to be given to the images manually. Since much effort is required to give the semantic labels to the vast number of images, it is difficult to use this technology in practice in many cases. This technology is a technology which can be applied to only images and cannot be applied to other content such as sounds, for example.

The technology disclosed in PTL 1 is a technology of generating new low-dimensional feature values on the assumption of a pair of two types of content which simultaneously co-occur by using the correlation. Unlike the technology disclosed in NPL 1, it is not necessary to directly give the semantic labels to the images. In this technology, the feature values are learned and generated based on statistical amounts (correlations) between feature values of content and feature values of a document. However, the simple correlation between the physical feature values of the content and the semantic feature values of the document is not significant in many cases. As a result, in many cases, it is difficult to obtain the feature values with which semantically related content can be found. In particular, it is necessary to obtain many pairs of the document and the content which simultaneously co-occur. Thus, if a sufficient number of pairs is not collected, it is difficult to obtain sufficient precision.

The technology of the present invention has been devised in view of the foregoing circumstances and an objective of the present invention is to provide a feature value generation method, a feature value generation device, and a feature value generation program capable of generating low-dimensional feature values with which semantic factors of content are ascertained from only moderate relevance given between sets of content even when the related pairs of two types of content are not obtained.

Means for Solving the Problem

To achieve the foregoing objective, according to an aspect of the present invention, there is provided a feature value generation method of learning feature value conversion functions that generate low-dimensional feature values of content when one or more first type of content groups including one or more first types of content, one or more second types of content groups including one or more second types of content, and a relation indicator indicating a relation between the first type of content group and the second type of content group are given. The feature value generation method includes: initial feature value extracting step which extracts initial feature values of the first type of content and the second type of content; content pair selecting step which selects a content pair by selecting one first type of content and one second type of content from each pair of groups indicated by the relation indicator; and feature value conversion function generating step which generates and outputs a feature value conversion function that converts the initial feature value of the first type of content into a low-dimensional feature value and a feature value conversion function that converts the initial feature value of the second type of content into a low-dimensional feature value based on all the content pair selected from each pair of groups.

The "content" is a set of electronic information which can be reproduced by an electronic device such as a computer and is, for example, images, videos, sounds, documents, and the like. The types of content can be classified in accordance with recording and reproduction formats of the content. For example, images and documents are different types of content. A group of content indicates a set of the same type of content and content of related factors is preferably collected in the group.

In content pair selecting step, a pair of a first type of content and a second type of content that have the highest correlation of the low-dimensional feature values converted using feature value conversion functions newly generated in the feature value conversion function generating step may be selected as a new content pair from each pair of groups. The selection of the new content pair in the content pair selecting step and the generation of the feature value conversion functions in the feature value conversion function generating step using the new content pair may be repeated until an ending condition is satisfied.

The feature value conversion functions may be a transformation matrix for the first type of content and a transformation matrix for the second type of content. The low-dimensional feature value of the first type of content may be generated by multiplying the initial feature value of the first type of content by the transformation matrix for the first type of content. The low-dimensional feature value of the second type of content may be generated by multiplying the initial feature value of the second type of content by the transformation matrix for the second type of content. In the feature value conversion function generating step, the transformation matrix for the first type content and the transformation matrix for the second type of content may be learned so that correlation between the low-dimensional feature values of the content pair is maximum.

According to another aspect of the present invention, a feature value generation device learns feature value conversion functions that generate low-dimensional feature values of content when one or more first type of content groups including one or more first types of content, one or more second types of content groups including one or more second types of content, and a relation indicator indicating a relation between the first type of content group and the second type of content group are given. The feature value generation device includes: an initial feature value extracting unit configured to extract initial feature values of the first type of content and the second type of content; a content pair selecting unit configured to select a content pair by selecting one first type of content and one second type of content from each pair of groups indicated by the relation indicator; and a feature value conversion function generating unit configured to generate and output a feature value conversion function that converts the initial feature value of the first type of content into a low-dimensional feature value and a feature value conversion function that converts the initial feature value of the second type of content into a low-dimensional feature value based on all the content pair selected from each pair of groups.

The content pair selecting unit may select, as a new content pair, a pair of a first type of content and a second type of content that have the highest correlation of the low-dimensional feature values converted using feature value conversion functions newly generated by the feature value conversion function generating unit from each pair of groups. The selection of the new content pair by the content pair selecting unit and the generation of the feature value conversion functions by the feature value conversion function generating unit using the new content pair may be repeated until an ending condition is satisfied.

The feature value conversion functions may be a transformation matrix for the first type of content and a transformation matrix for the second type of content. The low-dimensional feature value of the first type of content may be generated by multiplying the initial feature value of the first type of content by the transformation matrix for the first type of content. The low-dimensional feature value of the second type of content may be generated by multiplying the initial feature value of the second type of content by the transformation matrix for the second type of content. The feature value conversion function generating unit may learn the transformation matrix for the first type of content and the transformation matrix of the second type of content so that correlation between the low-dimensional feature values of the content pair is maximum.

A feature value generation program according to the present invention is a program causing a computer to perform each step of the feature value generation method.

Effects of the Invention

According to the present invention that has the foregoing characteristics, it is possible to provide the feature value generation method, the feature value generation device, and the feature value generation program capable of generating the low-dimensional feature values with which semantic factors of content are ascertained even when a pair of two types of content may not be obtained, by selecting a pair of appropriate content from the pairs of related groups and learning the feature value conversion functions that generate the low-dimensional feature values so that correlation between the low-dimensional feature values of the pair of contents is improved even when only relevance between groups, a group of a first type of content (for example, images) and a group of a second type of content (for example, documents), is given. As a result, it is possible to generate the feature values of the content with which semantically similar content can be found.

DESCRIPTION OF EMBODIMENTS

Hereinafter, embodiments of the present invention will be described in detail with reference to the drawings.

Figure 1:
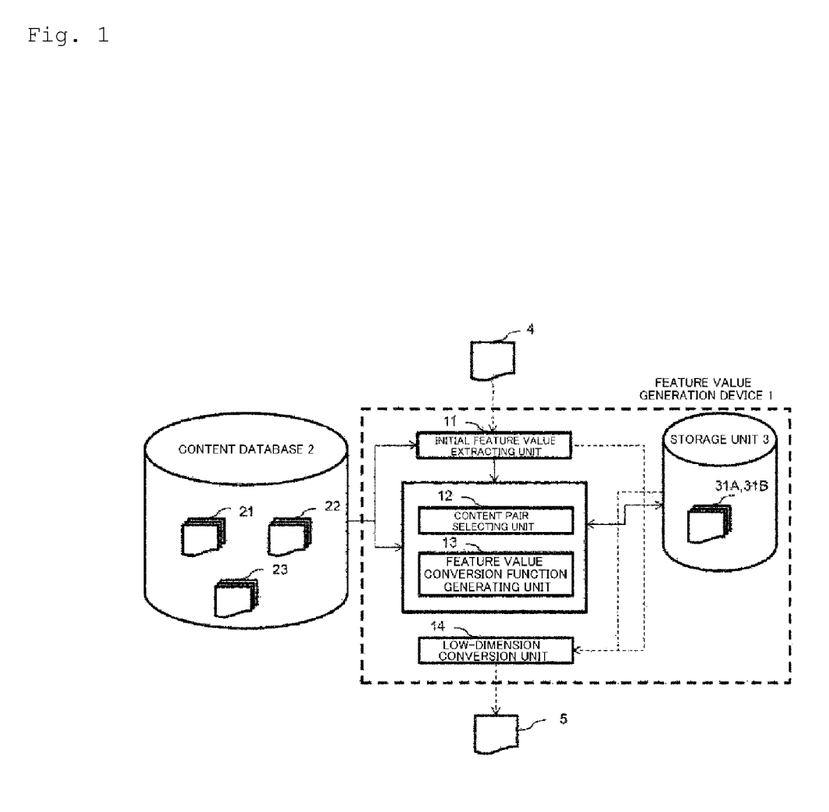
FIG. 1 is a block diagram illustrating a configuration of a feature value generation device according to a first embodiment of the present invention.

FIG. 1 is a functional block diagram illustrating an example of a configuration of a feature value generation device 1 according to a first embodiment of the present invention. In the present invention, low-dimensional feature values that express semantic factors are generated from relevance between two types of content groups. In an example of the embodiment of the present invention, examples of an image and a document will be described as two types of content.

The feature value generation device 1 is configured as a computer or a server computer that has known hardware such as an arithmetic processing device, a main storage device, an auxiliary storage device, a data bus, an input and output interface, and a communication interface. Various programs that realize a feature value generation program are loaded to the main storage device and subsequently executed by the arithmetic processing device to function as units of the feature value generation device 1. In the embodiment, various programs are stored in the auxiliary storage device included in the feature value generation device 1, but storage destinations of various programs are not limited thereto. The programs may be recorded on recording media such as magnetic disks, optical discs, or semiconductor memories or may be supplied via a network. Any other constituents may not necessarily be realized by a single computer or server computer, but may be distributed and realized by a plurality of computers connected via a network.

The feature value generation device 1 illustrated in FIG. 1 includes an initial feature value extracting unit 11, a content pair selecting unit 12, a feature value conversion function generating unit 13, and a low-dimension conversion unit 14. The feature value generation device 1 includes a storage unit 3 as an auxiliary storage device.

The feature value generation device 1 is connected to the content database 2 via a communicator to perform information communication.

The feature value generation device 1 mainly performs two steps of processing. First, the feature value generation device 1 performs a feature value conversion function learning processing to generate a feature value conversion function 31 based on a first type of content group 21, a second type of content group 22, and a relation indicator 23 registered in the content database 2 and store the feature value conversion function 31 in the storage unit 3.

Further, the feature value generation device 1 performs feature value conversion processing of generating a new low-dimensional feature value 5 based on an initial feature value of content 4 which is a semantic factor determination target using a feature value conversion function 31 generated by learning. Hereinafter, the content 4 will be described as an image. The content 4 is set as the image file 4.

In FIG. 1, a solid arrow indicates data communication and a data communication direction at the time of feature value conversion function learning processing and a dotted arrow indicates data communication and a data communication direction in feature value conversion processing.

The content database 2 may be located inside or outside of the feature value generation device 1. Any known communicator can be used as the above-described communicator. In the embodiment, the content database 2 is assumed to be located outside of the feature value generation device 1. The feature value generation device 1 is assumed to be connected to the content database 2 via a communicator such as the Internet to communicate in conformity with as a protocol such as transmission control protocol/Internet protocol (TCP/IP). However, the present invention is not limited thereto and the feature value generation device 1 may be connected to the content database 2 by a communicator in conformity with another protocol. In the embodiment, the content database 2 is configured as a computer or a server computer that has known hardware such as an arithmetic processing device, a main storage device, an auxiliary storage device, a data bus, an input and output interface, and a communication interface. The content database 2 includes a so-called relational database management system (RDBMS), but the present invention is not limited thereto. The content database 2 may be a database using another management system.

As illustrated in FIG. 1, the content database 2 stores the first type of content group 21, the second type of content group 22, and the relation indicator 23. Hereinafter, a case in which a first type of content is an image file and a second type of content is a document file will be described as an example. The first type of content group 21 is configured as one or more sets of groups formed by one or more image files. Similarly, the second type of content group 22 is configured as one or more sets of groups formed by one or more document files.

In the content database 2, a file identifier for uniquely identifying each file (for example, an ID configured of a serial number specific to a file) is associated with each file included in the first type of content group 21 and the second type of content group 22. Therefore, by designating the file identifier, it is possible to refer to any file.

Further, for each group included in the first type of content group 21 and the second type of content group 22, it is assumed that there is a group identifier for uniquely identifying each group, and the group identifier is stored in association with the above file identifier. For example, the group identifier and the file identifier are stored so that the file identifier of each image file belonging to a "group in which the group identifier is 'image group 1'" among the first type of content groups 21 can be referred to. Conversely, the group identifier and the file identifier are stored so that the group identifier to which an image file belongs can be referred to from the file identifier of any image file.

The relation indicator 23 indicates a relation between an image group of the first type of content group 21 and the document group of the second type of content group 22 and describes a pair of group identifiers of the image group and the document group determined to have a mutual relation. Here, the "relation" is preferably given based on relevance of a semantic factor. As a scheme of generating a pair of group identifiers, any scheme can be adopted. For example, the pair of group identifiers may be generated manually, may be generated mechanically, or may be generated manually and mechanically.

For example, the following scheme can be adopted when the relation indicator 23 is generated manually for the image group that has the group identifier of an "image group 3" and the document group that has the group identifier of a "document group 8". As the following scheme, it is considered that factors of images of an image file belonging to the image group 3 and documents of a document file belonging to the document group 8 are determined to be related mutually from the viewpoint of human eyes. In this case, information indicating {"image group 3," "document group 8"} which is the pair of group identifiers is stored as the relation indicator 23 in the content database 2 in response to an instruction from a user.

For example, when the pair of group identifiers are generated mechanically, image files and document files can be collected from web pages, for example. As a most simple method, an image file group and a document file group in the same web page are considered to be mutually related, a group identifier is given with the image file group set as "image group A" and the document file group set as "document group B," and information indicating {"image group A," "document group B"} which is the pair of group identifiers is stored as the relation indicator 23 in the content database 2. When the pair of group identifiers are generated mechanically, there is the advantage of obtaining the relation indicator 23 without manual processing. Further, it is possible to obtain the advantage of the present invention, that is, the advantage that a semantically related low-dimensional feature value can be generated from only a moderate relation between groups without manual processing.

Further, for example, data expressing factors of files of the first type of content group 21 or the second type of content group 22 (a title, an outline sentence, a keyword, or the like), data regarding a format, or the like may be included as metadata. In the embodiment, an example in which metadata is not used will be described.

<<Processing Unit>>

Next, each processing unit of the feature value generation device 1 according to the embodiment will be described.

The initial feature value extracting unit 11 acquires image files of the first type of content group 21 and document files of the second type of content group 22 stored in the content database 2, extracts initial feature values of the image files and initial feature values of the document files, and outputs the initial feature values to the content pair selecting unit 12 in the feature value conversion function learning processing. On the other hand, in the feature value conversion processing, the image file 4 input in response to an instruction of a user from the outside of the feature value generation device 1 is acquired via the above-described communicator, the acquired image file 4 is analyzed, the initial feature value of the image file 4 is extracted, and the initial feature value is output to the low-dimension conversion unit 14. Alternatively, in the feature value conversion processing, when the document file input in response to an instruction of a user from the outside of the feature value generation device 1 is acquired via the above-described communicator, the acquired document file is analyzed, the initial feature value of the document file is extracted, and the initial feature value is output to the low-dimension conversion unit 14.

The initial feature value extracting unit 11 inputs the initial feature value of each image file of the first type of content group 21 and the initial feature value of each document file of the second type of content group 22 to the content pair selecting unit 12. The content pair selecting unit 12 reads the relation indicator 23 from the content database 2 and reads the feature value conversion function 31 from the storage unit 3. Based on the input initial feature values, the read relation indicator 23, and the feature value conversion function 31, the content pair selecting unit 12 selects one image file and one document file as a content pair in conformity with a description of the relation indicator 23 and outputs the content pair to the feature value conversion function generating unit 13. Here, the image file and the document file are respectively selected from a pair of an image group and a document group that have a relation in the first type of content group 21 and the second type of content group 22.

The feature value conversion function generating unit 13 analyzes the content pair input from the content pair selecting unit 12 and the initial feature values corresponding to the content pair. Then, the feature value conversion function generating unit 13 learns and generates a new feature value conversion function 31A of converting the initial feature value of the image file into a new low-dimensional feature value and a new feature value conversion function 31B of converting the initial feature value of the document file into a new low-dimensional feature value and stores the feature value conversion function 31A and the feature value conversion function 31B in the storage unit 3.

The low-dimension conversion unit 14 acquires the initial feature value of the image file 4 from the initial feature value extracting unit 11, reads the feature value conversion function 31A from the storage unit 3, and converts the initial feature value into the low-dimensional feature value 5 using the feature value conversion function 31A to generate a low-dimensional feature value 5. Alternatively, the low-dimension conversion unit 14 acquires the initial feature value of the document file from the initial feature value extracting unit 11, reads the feature value conversion function 31B from the storage unit 3, and converts the initial feature value into the low-dimensional feature value using the feature value conversion function 31B to generate a low-dimensional feature value.

<<Processing Overview>>

Next, each of flows of two steps of processing of the feature value generation device 1 according to the embodiment will be described. The feature value generation device 1 according to the embodiment performs the feature value conversion function learning of learning and generating the feature value conversion function and the feature value conversion processing of converting the initial feature values into low-dimensional feature values.

<<Overview of Feature Value Conversion Function Learning Processing>>

Figure 2:
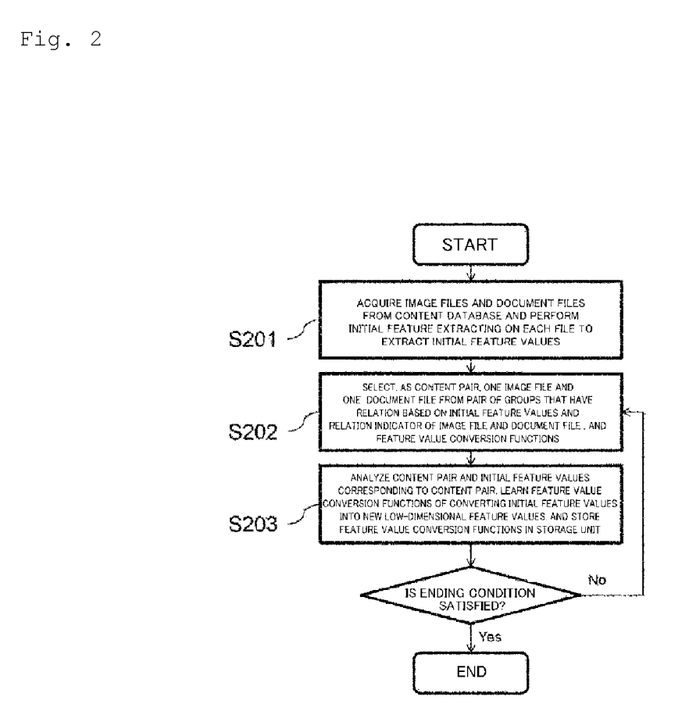
FIG. 2 is a flowchart illustrating a flow of feature value conversion function learning processing in a feature value generation device according to the first embodiment of the present invention.

First, the feature value conversion function learning processing will be described. FIG. 2 is a flowchart illustrating a flow of the feature value conversion function learning processing. Before the feature value conversion processing is performed on the image file 4, the feature value conversion function learning processing is performed at least once and is performed at a timing at which an instruction is input from a user.

In step S201, the initial feature value extracting unit 11 acquires the first type of content group 21 and the second type of content group 22 from the content database 2. Then, the initial feature value extracting unit 11 performs feature extracting on each of the images of the image files included in the acquired first type of content group 21 and each of the documents of the document files included in the acquired second type of content group 22, extracts the initial feature values, and outputs the initial feature values to the content pair selecting unit 12.

Subsequently, in step S202, the initial feature value extracting unit 11 inputs the initial feature value of each image file of the first type of content group 21 and the initial feature value of each document file of the second type of content group 22 to the content pair selecting unit 12. Then, the content pair selecting unit 12 reads the relation indicator 23 from the content database 2 and reads the feature value conversion functions 31A and 31B from the storage unit 3. Then, the content pair selecting unit 12 selects one image file and one document file as a content pair in conformity with the description of the relation indicator 23 based on the input initial feature values, the read relation indicator 23, and the feature value conversion functions 31A and 31B and outputs the content pair to the feature value conversion function generating unit 13. Here, the image file and the document file are each selected from the pair of the image group and the document group that has the relation in the first type of content group 21 and the second type of content group 22.

Subsequently, in step S203, the feature value conversion function generating unit 13 analyzes the content pair input from the content pair selecting unit 12 and the initial feature values corresponding to the content pair. Then, the feature value conversion function generating unit 13 learns and generates the feature value conversion function 31A of converting the initial feature value of the image file into a new low-dimensional feature value and the feature value conversion function 31B of converting the initial feature value of the document file into a new low-dimensional feature value and stores the feature value conversion function 31A and the feature value conversion function 31B in the storage unit 3.

Subsequently, it is verified whether an ending condition is satisfied. When the ending condition is satisfied, the processing ends. When the ending condition is not satisfied, the processing returns to step S202 and the processing is repeated.

Through the foregoing processing, the feature value generation device 1 generates the feature value conversion functions 31 from the first type of content group 21, the second type of content group 22, and the relation indicator 23 stored in the content database 2. The details of various steps of the processing to be performed will be described below.

<<Overview of Feature Value Conversion Processing>>

Figure 3:
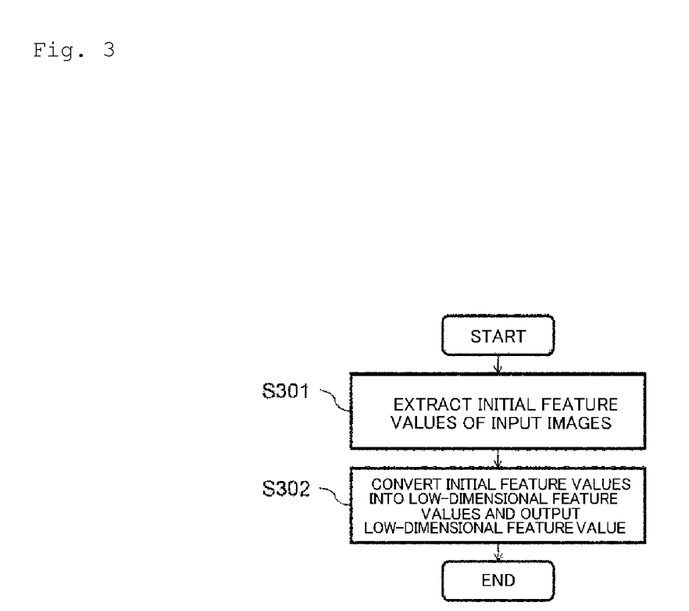
FIG. 3 is a flowchart illustrating a flow of feature value conversion processing in a feature value generation device according to the first embodiment of the present invention.

Next, the feature value conversion processing will be described. FIG. 3 is a flowchart illustrating a flow of the feature value conversion processing. The feature value conversion processing is performed to convert the initial feature value of the image file 4 into low-dimensional feature values using the feature value conversion function 31A stored in the storage unit 3. The feature value conversion processing is performed at a timing at which an instruction is input from a user after the user designates the image file 4.

In step S301, the initial feature value extracting unit 11 acquires the image file 4 designated by the user via the above-described communicator, extracts the initial feature value of the acquired image file 4, and outputs the initial feature value to the low-dimension conversion unit 14. In the embodiment, the image file 4 designated by the user is acquired, but the method of acquiring the image file 4 is not limited thereto. When the image file 4 is stored in the storage unit 3, the image file 4 may be acquired from the storage unit 3.

Subsequently, in step S302, the low-dimension conversion unit 14 converts the initial feature value acquired from the initial feature value extracting unit 11 into low-dimensional feature value 5 based on the feature value conversion function 31A acquired from the storage unit 3 and outputs the low-dimensional feature values.

Through the foregoing processing, the feature value generation device 1 obtains the low-dimensional feature value 5 of the image file 4 designated by the user.

By obtaining the low-dimensional feature values 5 of the image, it is possible to correctly evaluate the semantically related content when semantically similar content is found, and it is possible to evaluate semantically close content. A large storage region is necessary in order to evaluate the large amount of content. However, a storage region can be saved using the low-dimensional feature value 5.

In the embodiment of the present invention, processing which depends on a type of content is only processing of the initial feature value extracting unit. Even when relevance of semantic factors of other types of content (for example, sounds or videos) is handled, the processing can be appropriately designed for application. As described above, the images and the documents have been described as an example. However, for example, low-dimensional feature values expressing semantic factors may be generated from relevance between groups of two types of content of a sound and a document, or low-dimensional feature values expressing semantic factors may be generated from relevance between groups of two types of content of a video and a document. Alternatively, low-dimensional feature values expressing relevance between groups of two types of content of an image and a sound may be generated, or low-dimensional feature values expressing relevance by combining two types of content selected from various types of content may be generated.

<<Details of Each Processing>>

Hereinafter, details of each step of the above-described processing will be described as an example of the embodiment.

[Initial Feature Value Extracting]

An initial feature value extraction method of extracting the initial feature values will be described. Numeral data may be used as the initial feature values. The initial feature values are effective when the initial feature values have vectors that have scalars or dimensions. The initial feature values to be extracted are not important as requirements of the present embodiment and known initial feature values may be extracted using a known feature extracting. The same applies to not only image or document content but also other types of content such as sounds or videos.

First, an example of initial feature extracting processing on image files of the first type of content group 21 appropriate for an example of the embodiment will be described.

For example, feature values such as brightness features, color features, texture features, concept features, or landscape features are extracted as initial feature values.

When the brightness feature is extracted, the brightness feature is extracted as a histogram by numbering V values in an HSV color space. In this case, each image included in the first type of content group 21 is expressed as a vector that has the same number of dimensions as a quantization number of V values (for example, 256 grayscales in the case of 16 bit quantization).

When the color feature is extracted, the color feature is extracted as a histogram by numbering values of each axis (L*, a*, and b*) in an L*a*b* color space. At this time, the number of bins of the histogram of each axis may be 4 for L*, may be 14 for a*, and 14 for b*, for example. In this case, each image included in the first type of content group 21 is expressed as a vector in which the number of total bins of the three axes is 4×14×14=784, that is, 784 dimensions.

When the texture feature is extracted, a statistical amount (contrast) of a density histogram, a power spectrum, or the like is extracted. Alternatively, a local feature value may be extracted. It is preferable to extract the local feature value because the local feature can be extracted as a histogram like a color, a motion, or the like. As the local feature value, for example, a scale invariant feature transform (SIFT) or the like described in Reference Document 1 below can be used.

[Reference Document 1] D. G. Lowe, "Distinctive Image Features from Scale-Invariant Keypoints," International Journal of Computer Vision, pp. 91-110, 2004.

The local feature value extracted in this way is expressed a real-valued vector of 128 dimensions, for example. A histogram is generated by converting the vector into a sign with reference to a sign length generated by learning the vector in advance and numbering the number of signs. In this case, the number of bins of the histogram matches the number of signs of the sign length. Alternatively, as the local feature value, a sparse representation described in Reference Document 2, feature representations based on a Fisher kernel described in Reference Documents 3 and 4, or the like may be used.

[Reference Document 2] Jinjun Wang, Jianchao Yang, Kai Yu, Fengjun Lv, Thomas Huang, and Yihong Gong, "Locality-constrained Linear Coding for Image Classification," IEEE Conference on Computer Vision and Pattern Recognition, pp. 3360 to 3367, 2010.

[Reference Document 3] Florent Perronnin, Jorge Sanchez, Thomas Mensink, "Improving the Fisher Kernel for Large-Scale Image Classification," European Conference on Computer Vision, pp. 143 to 156, 2010.

[Reference Document 4] Herve Jegou, Florent Perronnin, Matthijs Douze, Jorge Sanchez, Patrick Perez, Cordelia Schmid, "Aggregating Local Image Descriptors into Compact Codes", IEEE Trans. Pattern Recognition and Machine Intelligence, Vol. 34, No. 9, pp. 1704 to 1716, 2012.

Even when any certain local feature value is used, an initial feature value generated as a result serves as a real-valued vector with a length which depends on the number of signs of the sign length.

When the concept feature is extracted, a feature value such as an object included in an image or an event captured in an image is extracted as an initial feature value. As the extracted object, event, or the like, any object, event, or the like may be used. For example, "sea", "mountain", "ball", or the like may be used. When "sea" is shown in an image, the image is determined to be an image which belongs to a concept of "sea". Whether each image belongs to each concept is identified using a concept identifier. In general, when one concept identifier is prepared for each concept and a feature value of an image is input, whether the image belongs to an identification target concept is output as a belonging level. The concept identifier is obtained by learning a relation between a feature value (for example, the above-described local feature value) of an image and a correct label which is input in advance manually and indicates a concept to which the image belongs. For example, a support vector machine may be used as a learning machine. When the concept feature is extracted, levels belonging to concepts are collectively expressed as a vector. In this case, the generated initial feature value is a vector that has the same number of dimensions as the number of concepts.

The landscape feature is a feature value expressing a view or a scene of an image. When the landscape feature is extracted, for example, a GIST descriptor described in Reference Document 5 below can be employed. The GIST descriptor is expressed by a coefficient when an image is divided into a plurality of regions and a filter that has a constant orientation is applied to each of the divided regions. In this case, however, the generated initial feature value is a vector with a length which depends on types of filters (the number of divisions of the regions and the number of orientations).

[Reference Document 5] A. Oliva and A. Torralba, "Building the gist of a scene: the role of global image features in recognition," Progress in Brain Research, 155, pp. 23 to 36, 2006.

A feature value by CNN described in NPL 1 may be extracted as an initial feature value.

Next, an example of the initial feature extracting on document files of the second type of content group 22 appropriate for an example of the embodiment will be described.

As a simplest feature value, a histogram of words included in a document can be used. Alternatively, a feature value by a skip-gram (SG) and continuous bag-of-words (CBOW) described in Reference Document 6 below may be applied.

[Reference Document 6] T. Mikolov, I. Sutskever, K. Chen, G. S. Corrado, and J. Dean, "Distributed Representations of Words and Phrases and Their Compositionality," In Proc., Advances in Neural Information Processing Systems (NIPS), 2013.

The initial feature value extracting on the image file and the document file has been described above. An example of the initial feature value extracting on other types of content will be described. First, when content is a sound file, for example, sound pitch features, sound pressure features, spectrum features, rhythm features, speech features, music features, sound event features, or the like are extracted as initial feature values.

When sound pitch features are extracted, for example, feature values of sound pitches (pitches) may be extracted from sound files. As an extracting method, for example, a method or the like described in a reference web site below can be applied. In this case, the pitches may be expressed as 1-dimensional vectors (scalars) or pitches may be quantized to a plurality of dimensions and may be expressed as vectors with a plurality of dimensions.

[Reference Web site] http://en.wikipedia.org/wiki/Pitch_detection_algorithm

When sound pressure features are extracted, feature values with amplitude values of voice waveform data may be extracted as initial feature values from sound files. Short-time power spectra of voice waveform data may be extracted from sound files, an average power with any band may be calculated to obtain feature values, and the feature values may be set as the initial feature values. When amplitude values of the voice waveform data is extracted or the short-time power spectra are extracted, the generated initial feature values are vectors with a length that depends on the number of bands for calculating a sound pressure.

When spectrum features are extracted, for example, feature values of Mel-frequency cepstral coefficients (MFCC) may be extracted as initial feature values from sound files.

When the rhythm features are extracted, for example, feature values of tempos may be extracted as initial feature values from a sound file. When the tempos are extracted, for example, a method described in Reference Document 7 below can be applied.

[Reference Document 7] E. D. Scheirer, "Tempo and Beat Analysis of Acoustic Musical Signals," Journal of Acoustic Society America, Vol. 103, Issue 1, pp. 588 to 601, 1998.

The speech feature and the music feature each indicate presence or absence of speech and presence or absence of music. When the speech feature or the music feature is extracted, a section in which there is a speech or music may be extracted as a feature value from a sound file. To identify a section in which there is a speech or music, for example, a method described in Reference Document 8 below can be applied.

[Reference Document 8] K. Minami, A. Akutsu, H. Hamada, and Y. Tonomura, "Video Handling with Music and Speech Detection," IEEE Multimedia, vol. 5, no. 3, pp. 17 to 25, 1998.

When the sound event features are extracted, for example, occurrence of emotional voices such as laughing voices or loud voices or environmental sounds such as gunshots or explosion sounds may be detected as sound events and feature values of such sound events may be extracted as initial feature values. When such sound events are detected, for example, a method described in Reference Document 9 below can be applied.

[Reference Document 9] PCT International Publication No. WO 2008/032787

When content is a video file, initial feature values can be extracted using the above-described image features and sound features because a video is generally an image and sound stream. When a section of a certain image of a video file is analyzed or a section of a certain sound of the video file is analyzed, for example, the video file is divided in advance into a plurality of sections and one image is extracted for each section to extract feature values. The video file is divided into a plurality of sections in advance and a sound feature value of each section is extracted. In this way, the initial feature extracting is performed.

When a video file is divided into a plurality of sections, the video file may be divided at pre-decided constant intervals or, for example, a division method described in Reference Document 10 below may be applied so that sections are divided at cut points which are points at which a video is paused discontinuously. The latter division method may be preferably applied. As a result obtained by dividing a video into a plurality of sections, it is possible to obtain a starting point (a starting time) and an ending point (an ending time) of each section. The feature value may be handled as a separate initial feature value for each time.

[Reference Document 10] Y. Tonomura, A. Akutsu, Y. Taniguchi, and G. Suzuki, "Structured Video Computing," IEEE Multimedia, pp. 34 to 43, 1994.

The initial feature value extracted in this way may be a single feature value among the extracted feature values or may be a feature value calculated from a plurality of feature values. The initial feature values are not limited to the feature values extracted by the above-described methods. The feature values acquired by other known extraction methods may be used as the initial feature values. [Selecting content pair]

Next, a method of selecting a content pair will be described in detail.

In the first type of content group 21, $x_{ji}$ stands for an initial feature value extracted from an i-th image file belonging to a j-th group. Similarly, in the second type of content group 22, $y_{ji}$ stands for an initial feature value extracted from a i-th document file belonging to the j-th group. $D_x$ stands for a dimension of the initial feature value of the image file and $D_y$ stands for a dimension of the initial feature value of the document file.

$X_j = \{x_{j1}, x_{j2}, \ldots, x_{jN_{jx}}\}$ denotes a set of the initial feature values of the image file belonging to the j-th group and $Y_j = \{y_{j1}, y_{j2}, \ldots, y_{jN_{jy}}\}$ denotes a set of the initial feature values of the document file. $N_{jx}$ is the number of initial feature values of the image file included in $X_j$ and $N_{jy}$ is the number of initial feature values of the document file included in $Y_j$. Hereinafter, $X_j$ and $Y_j$ are an image group and a document group that have a relation indicated by the relation indicator without loss of a general property and M denotes the number of groups. These are assumed to be normalized to an average 0. That is, a vector averaged for all i and j of the initial feature value $x_{ji}$ is 0 vector.

A purpose of the feature value conversion function learning processing according to the present invention is to obtain a feature value conversion function f: $RD_x \rightarrow Rd$ of converting initial feature values of images into d low dimensions (where $d \leq D_x = N_{jx}$). As the format of the feature value conversion function f, any known format can be used as long as optimization can be realized by learning. However, the following linear function is used in the example of the embodiment of the present invention.

[Formula 1]

$$f(x) = A^T x \quad (1)$$

Here, A is a transformation matrix that has a size of $D_x \times d$. Further, a feature value conversion function g: $RD_y \rightarrow Rd$ of similarly converting an initial feature value of the document into d low dimensions (where $d \leq D_y = N_{jy}$) is determined as another feature value conversion function.

[Formula 2]

$$g(y) = B^T y \quad (2)$$

B is a transformation matrix that has a size of $D_y \times d$. When such a linear function is used, a purpose of the feature value conversion function learning processing is to obtain elements of A and B.

In the feature value conversion function learning processing in the example of the embodiment of the present invention, optimum A and B are obtained sequentially by repeating the selection of the content pair described here and the generation of the feature value conversion functions (that is, processing of obtaining elements of A and B) to be described below. Since neither elements A nor B is determined at a processing start time point, it is necessary to initialize A and B. As a simplest method, the value of each element can be determined using a random number. However, it is preferable to obtain initial values by a method such as principal component analysis. Hereinafter, values at a current repetition time point are assumed to be substituted into the elements A and B in the following description.

A purpose of selecting a content pair is to select one initial feature value $x_{jt}$ and one initial feature value $y_{jt}$ from $X_j$ and $Y_j$. There are various selection methods and the following three types of methods can be used as selection methods appropriate for the embodiment of the present invention.

(1. Selecting at Random)

One initial feature value included in X and one initial feature value included in $Y_j$ are selected at random and referred to as $x_{jt}$ and $y_{jt}$.

(2. Selecting Using Statistical Amounts)

Statistical amounts of $X_j$ and $Y_j$ are obtained and initial feature values closest to the statistical amounts are referred to as $x_{jt}$ and $y_{jt}$. For example, average values or median values may be used as the statistical amounts.

(3. Selecting Pair of Maximum Correlation)

From the viewpoint of precision, this method is the most preferable selection method. First, the initial feature values included in $X_j$ and $Y_j$ are converted into low-dimensional feature values based on (1) and (2) using A and B at the current time point. $U_j = \{u_{j1}, u_{j2}, \ldots u_{jNjx}\}$ denotes a set of low-dimensional feature values after conversion for $X_j$ and $V_j = \{v_{j1}, v_{j2}, \ldots, v_{jNjy}\}$ denotes a set of low-dimensional feature values after conversion for $Y_j$. Correlation between all the low-dimensional feature values included in $U_j$ and $V_j$ is obtained. Correlation between an i-th low-dimensional feature value $u_{ji}$ of $U_j$ and a k-th low-dimensional feature value $v_{jk}$ of $V_j$ can be obtained using the following expression.

[Formula 3]

$$\mathrm{corr}(u_{ji}, v_{jk}) = \frac{u_{ji}^T v_{jk}}{\|u_{ji}\| \|v_{jk}\|} \quad (3)$$

After the correlation is obtained for all i and k, the largest values of the correlation are set as content pair $x_{jt}$, $y_{jt}$.

[Formula 4]

$$(u_{jt}, v_{jt}) = \underset{(u_{ji}, v_{jk}) \in (U_j V_j)}{\mathrm{argmax}} \, \mathrm{corr}(u_{ji}, v_{jk}) \quad (4)$$

Through such processing, the content pair that has the highest correlation can be found among the low-dimensional feature values.

In the foregoing processing, the content pairs may be obtained for all the pairs of groups. In this way, the content pair can be selected.

[Generating Feature Value Conversion Functions]

Next, a method of generating the feature value conversion functions will be described in detail.

A purpose of the processing is to obtain the feature value conversion functions of converting the initial feature values into the low-dimensional feature values that have dimensions lower than the dimensions of the initial feature values based on the selected content pair so that the relation between the first type of content group 21 and the second type of content group 22 indicated by the relation indicator is preserved maximally.

To learn the feature value conversion functions so that the relation indicated by the relation indicator is stored, in the present invention, the feature value conversion functions f and g are obtained with regard to the selected content pairs so that the correlation between the low-dimensional feature values converted by the learned feature value conversion functions is the highest.

This can be performed by solving the following problem.

[Formula 5]

$$\max_{(A,B)} A^T X_t Y_t^T B \quad (5)$$

$$\text{subj. to:} \quad A^T X_t X_t^T A = I, \, B^T Y_t Y_t^T B = I$$

Here, $X_t = (x_{1t}, x_{2t}, \ldots, x_{Mt})$ and $Y_t = (y_{1t}, y_{2t}, \ldots, y_{Mt})$ are matrixes including the content pair of the pair of groups. This problem is known as canonical correlation analysis and can be solved as a generalized eigenvalue problem.

A and B obtained by solving this problem are obtained and output as the current feature value conversion functions 31A and 31B.

By repeating the selection of the content pair and the generation of the feature value conversion functions, as described above, it is possible to obtain the feature value conversion functions capable of obtaining the low-dimensional feature values with high precision gradually.

The repetition ends by verifying whether an ending condition is satisfied. As the ending condition appropriate for the example of the embodiment of the present invention, an ending condition such as "whether the repetition is performed a specific number" or "whether the selected content pair is not changed" is set.

The example of the feature value conversion function learning processing has been described above.

[Low-Dimension Conversion]

After the feature value conversion function f is obtained, a low-dimensional feature value can be obtained for any image. Specifically, after the initial feature values x are obtained by the above-described method and the initial feature values x are shifted so that an average value is 0, new low-dimensional feature values are calculated using Expression (1) above.

The case in which the metadata of the files are not used has been described above. Feature values obtained from metadata of each image file and each document file may be included in the initial feature values.

Figure 4:
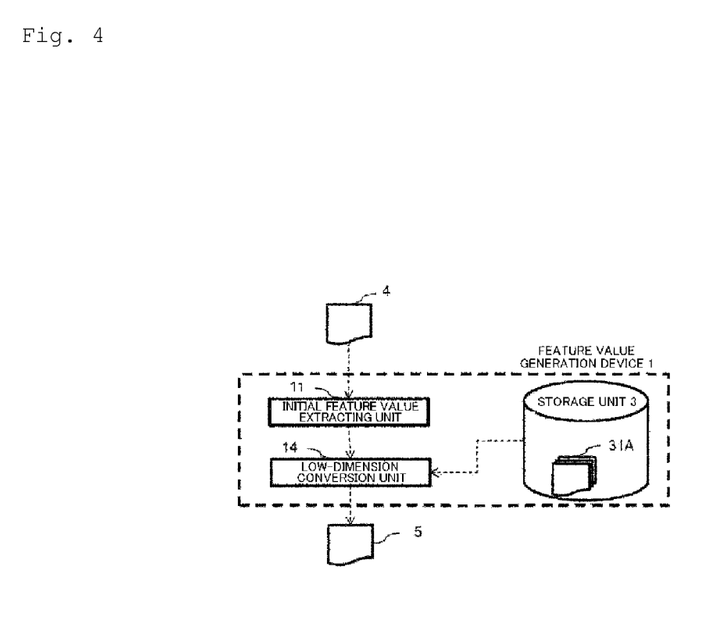
FIG. 4 is a block diagram illustrating a configuration of a feature value generation device according to a second embodiment of the present invention.

Next, in a second embodiment, an example of a configuration of the feature value generation device 1 in which it is not necessary to perform the feature value conversion function learning processing after the feature value conversion function 31 is learned will be described. Since each unit with the same reference numerals as those of the first embodiment has the same function as that of the first embodiment, detailed description will be omitted and only differences from the first embodiment will be described.

As illustrated in FIG. 4, a configuration in which the processing units related to the feature value conversion function learning processing are omitted can be adopted. The feature value generation device 1 in this case includes the initial feature value extracting unit 11, the low-dimension conversion unit 14, and the storage unit 3.

The initial feature value extracting unit 11 may have only functions of acquiring the image file 4 input in response to an instruction of a user from the outside (excluding the content database 2) of the feature value generation device 1 via the above-described communicator, analyzing the acquired image file 4, extracting the initial feature values of the image file 4, and outputting the initial feature values to the low-dimension conversion unit 14.

The feature value conversion function 31A stored in the storage unit 3 may be learned outside and received from the outside via the communicator and the latest feature value conversion function 31A may be stored in the storage unit 3.

In the second embodiment, processing similar to the feature value conversion processing described in the flowchart of FIG. 3 is performed to obtain the low-dimensional feature value 5 of the image file 4 designated by a user.

As described above, it is possible to provide the feature value generation method, the feature value generation device, and the feature value generation program according to the embodiment of the present invention capable of generating low-dimensional feature values with which semantic factors of content are ascertained from only modest relevance given between the sets of the content although a pair related to two types of content are not obtained.

The present invention is not limited to the above-described embodiments and various modifications or applications can be made within the scope of the present invention without departing from the gist of the present invention.

In the above-described embodiments, a central processing unit (CPU) that is a general processor is used as the arithmetic processing device. Further, it is preferable to provide a graphics processing unit (GPU) as necessary. Some of the above-described functions may be realized using, for example, a programmable logic device (PLD) such as a field programmable gate array (FPGA) that is a processor capable of changing a circuit configuration after manufacturing or a dedicated electrical circuit such as an application specific integrated circuit (ASIC) that has a circuit configuration designed only for performing specific processing.

REFERENCE SIGNS LIST 1 feature value generation device
2 content database
3 storage unit
4 content
5 low-dimensional feature value
11 initial feature value extracting unit
12 content pair selecting unit
13 feature value conversion function generating unit
14 low-dimension conversion unit
21 first content group
22 second content group
23 relation indicator
31A, 31B feature value conversion function

The invention claimed is:

1. A feature value generation method of learning feature value conversion functions that generate low-dimensional feature values of content when one or more first types of content groups including one or more first types of content, one or more second types of content groups including one or more second types of content, and a relation indicator indicating a relation between the first type of content group and the second type of content group are given, the feature value generation method comprising:
   extracting, by an initial feature amounts extractor, initial feature values of the first type of content and the second type of content;
   selecting, by a content pair selector, a content pair by selecting one first type of content and one second type of content from each pair of groups indicated by the relation indicator; and
   generating and outputting, by a feature amount conversion function generator:
      a feature value conversion function that converts the initial feature value of the first type of content into a low-dimensional feature value, and
      a feature value conversion function that converts the initial feature value of the second type of content into a low-dimensional feature value based on all the content pair selected from each pair of groups.

2. The feature value generation method according to claim 1,
   wherein, by the content pair selector, a pair of a first type of content and a second type of content that have the highest correlation of the low-dimensional feature values converted using feature value conversion functions newly generated by the feature amount conversion function generator is selected as a new content pair from each pair of groups, and
   wherein the selection of the new content pair by the content pair selector and the generation of the feature value conversion functions by the feature value conversion function generator using the new content pair are repeated until an ending condition is satisfied.

3. The feature value generation method according to claim 1,
   wherein the feature value conversion functions are a transformation matrix for the first type of content and a transformation matrix for the second type of content,
   wherein the low-dimensional feature value of the first type of content is generated by multiplying the initial feature value of the first type of content by the transformation matrix for the first type of content,
   wherein the low-dimensional feature value of the second type of content is generated by multiplying the initial feature value of the second type of content by the transformation matrix for the second type of content, and
   wherein, in the feature value conversion function generating step, the transformation matrix for the first type content and the transformation matrix for the second type of content are learned so that correlation between the low dimensional feature values of the content pair is maximum.

4. A feature value generation device that learns feature value conversion functions that generate low-dimensional feature values of content when one or more first types of content groups including one or more first types of content, one or more second types of content groups including one or more second types of content, and a relation indicator indicating a relation between the first type of content group and the second type of content group are given, the feature value generation device comprising:
- an initial feature value extractor configured to extract initial feature values of the first type of content and the second type of content;
- a content pair selector configured to select a content pair by selecting one first type of content and one second type of content from each pair of groups indicated by the relation indicator; and
- a feature value conversion function generator configured to generate and output a feature value conversion function that converts the initial feature value of the first type of content into a low-dimensional feature value and a feature value conversion function that converts the initial feature value of the second type of content into a low dimensional feature value based on all the content pair selected from each pair of groups.

5. The feature value generation device according to claim 4,
wherein the content pair selector selects, as a new content pair, a pair of the first type of content and the second type of content that have the highest correlation of the low-dimensional feature values converted using feature value conversion functions newly generated by the feature value conversion function generator from each pair of groups, and
wherein the selection of the new content pair by the content pair selector and the generation of the feature value conversion functions by the feature value conversion function generator using the new content pair are repeated until an ending condition is satisfied.

6. The feature value generation device according to claim 4,
wherein the feature value conversion functions are a transformation matrix for the first type of content and a transformation matrix for the second type of content,
wherein the low-dimensional feature value of the first type of content is generated by multiplying the initial feature value of the first type of content by the transformation matrix for the first type of content,
wherein the low-dimensional feature value of the second type of content is generated by multiplying the initial feature value of the second type of content by the transformation matrix for the second type of content, and
wherein the feature value conversion function generating unit learns the transformation matrix for the first type of content and the transformation matrix of the second type of content so that correlation between the low-dimensional feature values of the content pair is maximum.

7. A feature value generation program causing a computer to perform a feature value generation method of learning feature value conversion functions that generate low-dimensional feature values of content when one or more first types of content groups including one or more first types of content, one or more second types of content groups including one or more second types of content, and a relation indicator indicating a relation between the first type of content group and the second type of content group are given, the feature value generation method comprising:
- extracting, by an initial feature amounts extractor, initial feature values of the first type of content and the second type of content;
- selecting, by a content pair selector, a content pair by selecting one first type of content and one second type of content from each pair of groups indicated by the relation indicator; and
- generating and outputting, by a feature amount conversion function generator:
  - a feature value conversion function that converts the initial feature value of the first type of content into a low-dimensional feature value, and
  - a feature value conversion function that converts the initial feature value of the second type of content into a low-dimensional feature value based on all the content pair selected from each pair of groups.

8. The feature value generation method according to claim 2,
wherein the feature value conversion functions are a transformation matrix for the first type of content and a transformation matrix for the second type of content,
wherein the low-dimensional feature value of the first type of content is generated by multiplying the initial feature value of the first type of content by the transformation matrix for the first type of content,
wherein the low-dimensional feature value of the second type of content is generated by multiplying the initial feature value of the second type of content by the transformation matrix for the second type of content, and
wherein, in the feature value conversion function generating step, the transformation matrix for the first type content and the transformation matrix for the second type of content are learned so that correlation between the low dimensional feature values of the content pair is maximum.

9. The feature value generation device according to claim 5,
wherein the feature value conversion functions are a transformation matrix for the first type of content and a transformation matrix for the second type of content,
wherein the low-dimensional feature value of the first type of content is generated by multiplying the initial feature value of the first type of content by the transformation matrix for the first type of content,
wherein the low-dimensional feature value of the second type of content is generated by multiplying the initial feature value of the second type of content by the transformation matrix for the second type of content, and
wherein the feature value conversion function generating unit learns the transformation matrix for the first type of content and the transformation matrix of the second type of content so that correlation between the low-dimensional feature values of the content pair is maximum.

10. The feature value generation program according to claim 7,
wherein, by the content pair selector, a pair of a first type of content and a second type of content that have the highest correlation of the low-dimensional feature values converted using feature value conversion functions newly generated by the feature amount conversion function generator is selected as a new content pair from each pair of groups, and
wherein the selection of the new content pair by the content pair selector and the generation of the feature value conversion functions by the feature value conversion function generator using the new content pair are repeated until an ending condition is satisfied.

11. The feature value generation program according to claim 10,
wherein the feature value conversion functions are a transformation matrix for the first type of content and a transformation matrix for the second type of content,
wherein the low-dimensional feature value of the first type of content is generated by multiplying the initial feature value of the first type of content by the transformation matrix for the first type of content,
wherein the low-dimensional feature value of the second type of content is generated by multiplying the initial feature value of the second type of content by the transformation matrix for the second type of content, and
wherein, in the feature value conversion function generating step, the transformation matrix for the first type content and the transformation matrix for the second type of content are learned so that correlation between the low dimensional feature values of the content pair is maximum.

12. The feature value generation method according to claim 1, wherein the content includes a combination of image files and document files.

13. The feature value generation method according to claim 1, wherein a type of content is based at least on recording and reproduction formats of the content.

14. The feature value generation method according to claim 1, wherein the first type of content group and the second type of content group include distinct types of content.

15. The feature value generation method according to claim 1, wherein the first type of content group includes one or more image files and the second type of content group includes one or more document files.

16. The feature value generation device according to claim 4, wherein the content includes a combination of image files and document files.

17. The feature value generation device according to claim 4, wherein a type of content is based at least on recording and reproduction formats of the content.

18. The feature value generation device according to claim 4, wherein the first type of content group includes one or more image files and the second type of content group includes one or more document files.

19. The feature value generation program according to claim 7, wherein the content includes a combination of image files and document files.

20. The feature value generation program according to claim 7, wherein a type of content is based at least on recording and reproduction formats of the content.

* * * * *